INVENTOR.
FOSTER E. WELD
BY
Tilberry & Body
ATTORNEYS

United States Patent Office 3,440,608
Patented Apr. 22, 1969

3,440,608
REMOTE RELAY CONTROL CIRCUIT
Foster E. Weld, Newton Highlands, Mass., assignor to E. W. Bliss Company, Canton, Ohio, a corporation of Delaware
Filed July 7, 1965, Ser. No. 470,067
Int. Cl. H04g 1/16
U.S. Cl. 340—168                    11 Claims

ABSTRACT OF THE DISCLOSURE

A circuit is disclosed herein for sequentially controlling the operation of a plurality of remotely located devices, such as relays and the like, wherein the circuit includes a plurality of remote station bistable devices, such as toggle relays, each having first and second stable states in response to alternate application thereto of opposite polarity pulses; a like plurality of switching means, such as relay contacts, each associated with one of the bistable devices and each having first and second conditions in response to the first and second stable states, respectively, of its associated bistable device; each bistable device being connected in series with a switching means associated with a different polarity bistable device and a source of alternating polarity pulses; every other bistable device being normally in the first stable state and the intermediate bistable devices being normally in the second stable state; apparatus, such as a pulse reversal relay, for alternately applying alternate polarity pulses to the bistable devices, whereby the stable states of the bistable devices will be sequentially changed from a normal first state to a second state; and, time delay means, such as a thermistor connecting each bistable device in series with its associated switching means for delaying restoration to a normal stable state of the bistable device until a succeeding bistable device has been actuated to its second stable state through the switching means associated with the first bistable device.

---

Figure 1:
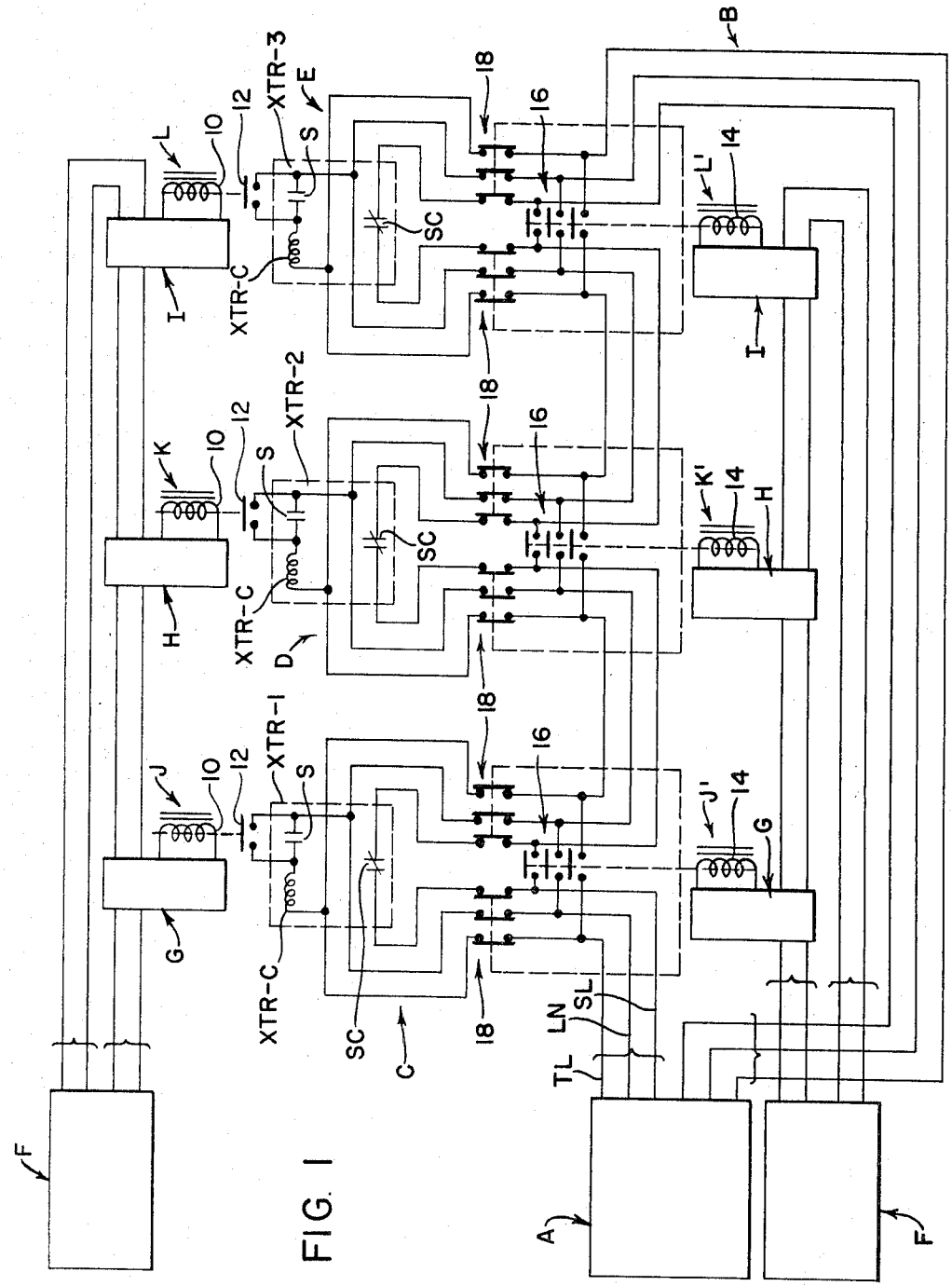

This invention relates to the art of control of remotely located devices and, more particularly, to a circuit for sequentially controlling energization of a plurality of remotely located devices.

The invention is particularly applicable for use in conjunction with remotely supervised signal systems and will be described with particular reference thereto, although it will be appreciated that the invention has broader applications and may be used, for example, wherever control of remotely located devices is desired.

A signaling system to which the present invention may be applied takes the form as disclosed in my copending United States patent application Ser. No. 470,845, filed July 9, 1965, entitled, "Signaling System," assigned to the same assignee as the present invention. That system includes a central station and a plurality of remotely located signaling transmitters each serving when activated to transmit distinctive coded signal impulses to the central station. Each transmitter includes a ratchet motor driving coil and a normally open, manually operable, activating switch in series with the coil across two conductors which extend from the central station. When an activating switch is closed, power is supplied to its associated ratchet motor driving coil from the central station through the two conductors. The ratchet motor serves to open and close a pair of signaling contacts in accordance with a distinctive code. The signaling contacts of all the transmitters are connected in series by a third conductor extending from the central station.

In order to assure reliability of such a signaling system as described above, it is desirable that the system include means for periodically testing the operativeness of the remotely located transmitters without requiring an operator to visit each transmitter and actuate its activating switch.

Frequently one or more of such transmitters are located within a wing of a building so that the three conductors connecting the transmitters define an open loop in that wing. Occasionally it is desired that the transmitters located in that wing be disconnected from the system without disrupting the operativeness of the remaining transmitters of the system.

The present invention is directed toward a circuit for controlling energization of remotely located devices which may be used, for example, for testing or disconnecting remotely located transmitters of a signalling system, thereby satisfying the foregoing needs, and others.

In accordance with the present invention, the circuit for sequentially controlling the operation of a plurality of remotely located devices includes a plurality of remote station bistable devices, such as magnetic toggle relays, each having first and second stable states responsive to alternate application thereto of opposite polarity pulses; a like plurality of switching means, such as normally open relay contacts, each associated with one of the bistable devices and having first and second conditions in response to the first and second stable states of its associated bistable device; circuit means connecting each bistable device in series with the switching means of a different polarity bistable device and a source of alternating polarity pulses; circuit means connecting the bistable devices so that every other device is normally in a first stable state and the intermediate devices are in a second stable state; and, means for alternately applying opposite polarity pulses to the bistable devices.

In accordance with another aspect of the invention, each bistable device is connected in series with its associated switching means through a time delay means, such as a thermistor, for delaying restoration to a normal stable state of the bistable device until a succeeding bistable device has been actuated to its second stable state through the switching means associated with the first bistable device.

The primary object of the present invention is to provide a circuit for sequentially energizing a plurality of remotely located devices.

Another object of the present invention is to provide a circuit for controlling the operation of a plurality of devices, which circuit is simple in construction and economical to manufacture.

A still further object of the present invention is to provide a simplified interconnected metallic circuit for controlling the operation of a plurality of remotely located devices.

A still further object of the present invention is to provide a circuit for sequentially testing the operativeness of a plurality of remotely located transmitters of a signaling system.

A still further object of the present invention is to provide a circuit for disconnecting fire alarm transmitters in an open loop within a signaling system without disruption in the operativeness of the remaining transmitters of the system.

Figure 2:
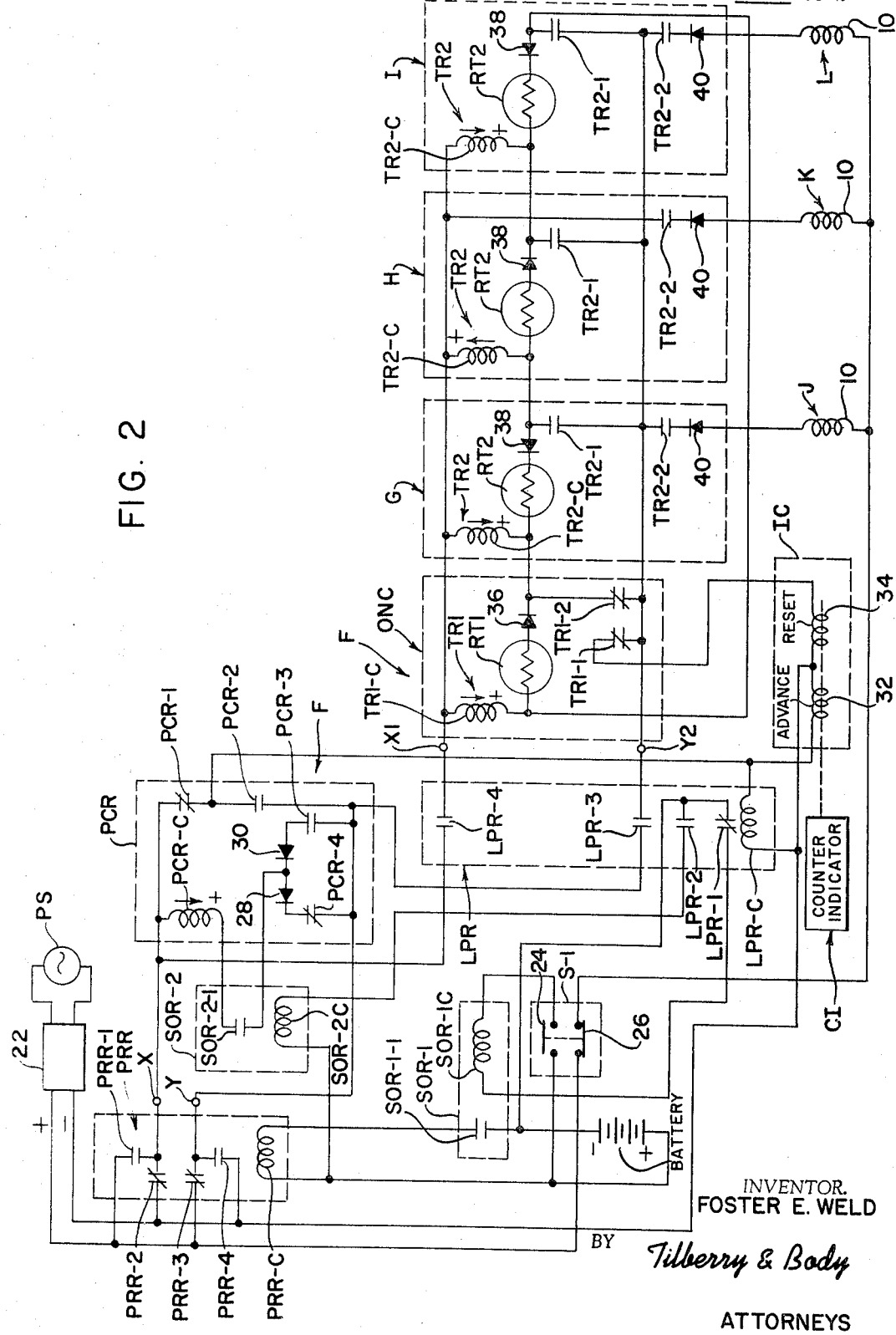

The invention may take physical form in certain parts and arrangement of parts, preferred embodiments of which will be described in detail in the specification and illustrated in the accompanying drawings which are a part hereof and wherein:

FIGURE 1 is a block diagram illustrating two embodiments of the invention, one for testing remotely located transmitters of a signaling system, the other for disconnecting transmitters within loops without disruption of the operativeness of the remaining transmitters; and FIGURE 2 is a schematic circuit diagram illustrating a preferred embodiment of the invention.

Referring now to the drawings wherein the showings are for the purpose of illustrating preferred embodiments of the invention only and not for the purpose of limiting same, there is illustrated in FIGURE 1 two embodiments of the invention for a signaling system taking the form as disclosed in my previously identified copending United States patent application Ser. No. 470,845, filed July 9, 1965. As illustrated in FIGURE 1 of the present application, as well as in detail in the above-identified patent application, that signaling system includes a central station A and a plurality of remotely located signaling transmitters XTR-1, XTR-2, XTR3, each serving when activated to transmit distinctive coded signal impulses to the central station. Each transmitter includes a ratchet motor driving coil XTR-C and a normally open, manually operable, transmitter activating switch S in series with the driving coil XTR-C across two transmitter conductors TL, LN which extend from the central station A, and a pair of normally closed signaling contacts SC connected in series with a signaling line conductor SL which also extends from the central station A. Power for energizing the driving coil XTR-C of each transmitter XTR-1 through XTR-3 is obtained from the central station A upon closure of a transmitter's activating switch S for driving suitable cam means, not shown, which open and close the signaling contacts SC in accordance with a distinctive code. As illustrated in FIGURE 1, the three conductors TL, LN, SL extend from the central station A to define a closed loop configuration B, as well as three open loop configurations C, D, E within the closed loop configuration B itself. For a more detailed description of the signaling system described thus far, reference should be made to my previously identified copending patent application.

In accordance with the present invention, a control circuit is provided which in one aspect serves for sequentially testing the operativeness of transmitters XTR-1 through XTR-3, and in accordance with another aspect serves for disconnecting a selected one of the open loop configurations C, D, E without disrupting the operativeness of the transmitters in the remaining open loop configurations. The first of these aspects of the invention may be referred to as the transmitter test aspect and the other may be referred to as the loop disconnect aspect, and will be described below in that order.

In the transmitter test aspect the invention includes generally a central station control circuit F connected to three remote station control circuits G, H, I for respectively controlling the operation of remotely located relays J, K, L. Relays J, K, L include relay coils 10 and normally open relay contacts 12 connected across manually ally open relay contacts 12 connected across normally open transmitter activating switches S of transmitters XTR-1, XTR-2, XTR-3, respectively. Energization of relay coil 10 of a selected relay J, K or L will cause its contacts 12 to close, short circuiting switch S to energize the driving coil XTR-C of its associated transmitter XTR-1 through XTR-3.

The loop disconnect aspect of the present invention is similar to that of the transmitter test aspect and like character references are used in FIGURE 1 for identifying like components, with the remotely located relays being identified as relays J', K', L'. Relays J', K', L' each includes a relay coil 14, three pairs of normally open relay contacts 16 and six pairs of normally closed relay contacts 18. Energization of relay coil 14 of a selected relay J', K' or L' will cause its contacts 16 to close and contacts 18 to open, thereby disconnecting the associated open loop C, D or E from the signaling system without disrupting the operativeness of the transmitters in the remaining open loops.

In accordance with the present invention the central station control circuit F and the remote station control circuits G, H, I serve to control the operation of remotely located devices, such as the relays J, K, L or J', K', L'. The control circuits F, G, H, I are identical whether relays J, K, L or J', K', L' are to be controlled and, accordingly, the following description is given only with respect to relays J, K, L.

Referring now to FIGURE 2, the invention is shown in schematic circuit diagram form and generally includes three remote station control circuits G, H, I; and, central station control circuitry F including a power supply PS, a battery BAT, a control switch S-1, a first slow operating relay SOR-1, a second slow operating relay SOR-2, a pulse reversing relay PRR, a pulse control relay PCR, a line pulsing relay LPR, an off-normal circuit ONC, an impulse counter IC, and a counter indicator CI.

The power supply PS preferably takes the form of 115 volts alternating current line voltage and is connected across the input of an inverter circuit 22 which serves to develop 115 volts D.C. current with the polarity as indicated by the markings "+" and "−" on the output of inverter circuit 22. Battery BAT preferably takes the form of a 24 volt battery and is connected across relay coil PRR-C of the pulse reversing relay PRR through normally open contacts SOR-1-1 of the first slow operating relay SOR-1. The pulse reversing relay circuit serves upon each energization of its coil PRR-C to reverse the polarity of the direct voltage appearing at its output terminals X and Y. The pulse reversing relay PRR also includes normally open relay contacts PRR-1 and normally closed relay contacts PRR-2 respectively connecting terminal X with the positive and negative sides of inverter circuit 22. Also, the pulse reversing relay includes normally closed relay contacts PRR-3 and normally open relay contacts PRR-4 respectively connecting terminal Y with the positive and negatives ides of inverter circuit 22.

The slow operating relay circuit SOR-1 preferably has a time delay on the order of two seconds and in addition to relay contacts SOR-1-1 also includes a relay coil SOR-1C which is connected to the relay coil PRR-C through normally open contacts 24 of switch S-1. The switch S-1 may take the form of any suitable switch such as a manually operable, rotary switch having one normally open set of contacts 24 and a second normally closed set of contacts 26.

The second slow operating relay SOR-2 preferably exhibits a time delay on the order of four seconds and includes a relay coil SOR-2C and normally open relay contacts SOR-2-1. The slow operating relay SOR-2 serves to control the operation of the pulse control relay PCR which includes a relay coil PCR-C, normally closed relay contacts PCR-1 and PCR-4, and normally open relay contacts PCR-2 and PCR-3. Relay coil PCR-C is connected across terminals X and Y through the normally open relay contacts SOR-2-1, the anode to cathode circuit of a diode 28 and the normally closed relay contacts PCR-4. A second diode 30, poled as shown with respect to diode 28, is connected in series with normally open relay contacts PCR-3 across the series circuit of diode 28 and normally closed relay contacts PCR-4. The normally closed relay contacts PCR-1 and the normally open relay contacts PCR-2 are connected together in series across terminals X and Y with the junction of the coils being connected to the negative side of inverter circuit 22 through relay coil LPR-C of the line pulsing relay LPR.

The line pulsing relay LPR also includes normally closed relay contacts LPR-1 and normally open relay contacts LPR-2, LPR-3, LPR-4. Relay contacts LPR-4 serve when closed to connect terminal X with a terminal X1 and contacts LPR-3 when closed serve to connect terminal Y with terminal Y1. The normally open relay contacts LPR-2 serve to connect one side of the slow operating relay coil SOR-2C with the negative side of battery BAT.

The impulse counter IC includes an advancing coil 32 and a resetting coil 34 for respectively advancing and resetting the counter indicator CI. The advancing coil 32 is connected from the junction of relay contacts PCR–1, PCR–2 to the negative side of inverter circuit 22.

The off-normal circuit ONC includes a relay TR1 having a relay coil TR1–C and a pair of normally closed relay contacts TR1–1, TR1–2. Relay TR1, as well as relay PCR, preferably takes the form of a magnetic toggle relay which is operated only by reversing the polarity of the energizing current applied to the coil. When the coil is energized by current flow therethrough in a particular direction, its relay contacts will have a first condition and will remain in that condition even upon loss of the energzing current until the relay coil is energized by current flow therethrough in the opposite direction. Any suitable magnetic toggle relay may be used for this purpose, such as, for example, a magnetic toggle relay supplied by American Monarch Company, Model MTR No. 15114. Relay coil TR1–C is connected across terminals X1 and Y1 through a thermistor RT1, the anode to cathode circuit of a diode 36 and the normally closed relay contacts TR1–2. The normally closed relay contacts TR1–1 are connected from terminal Y2 to the negative side of inverter circuit 22 through reset coil 34 of the impulse counter circuit IC.

The remote station control circuits G, H, I for controlling the operation of the remotely located relays J, K, L are substantially identical to each other and each includes a magnetic toggle relay TR2, similar to the toggle relay TR1 in the off-normal circuit ONC, having a coil TR2–C and a pair of normally open relay contacts TR2–1, TR2–2. Also, each of the control circuits G, H, I includes a thermistor RT2 and a diode 38 connected in series between relay coil TR2–C and relay contacts TR2–1. Relay coils TR2–C are connected together in parallel with each other and with coil TR1–C of off-normal circuit ONC. The thermistors RT2 are all connected together in series with diodes 38 and with thermistor RT1 and diode 36 in off-normal circuit ONC. A diode 40 in each of the control circuits G, H, I connects relay contacts TR2–2 with the coil 10 of remotely located relays J, K, L, respectively.

The magnetic toggle relays TR1 and TR2 are all shown with their relay contacts in the condition corresponding to application of a positive potential to the coil terminals where indicated by the "+" markings in FIGURE 2. Energization in the reverse direction will position the relay contacts opposite to that shown. Diodes 38 of circuits G, H, I are alternately poled oppositely, as indicated in FIGURE 2, and diode 36 is poled oppositely of diode 38 in the circuit G. Each of the toggle relay coils is connected across terminals X1 and Y1 through the relay contacts of a different toggle relay. Thus, with reference to FIGURE 2, it will be noted that toggle relay coil TR2–C of control circuit G is connected across terminals X1 and Y1 through normally closed toggle relay contacts TR1–2, that coil TR2–C of circuit H is connected across terminals X1 and Y1 through normally open toggle relay contacts TR2–1 of circuit G, that coil TR2–C of circuit I is connected across terminals X1 and Y1 through normally open toggle relay contacts TR2–1 of circuit H, and that the toggle relay coil TR1–C is connected across terminals X1 and Y1 through normally open toggle relay contacts TR2–1 of circuit I.

OPERATION

The invention is illustrated in FIGURE 2 with all of its various components in their normal condition. The impulse indicator CI is set at a zero count and no remote devices, i.e., relays J, K, L, are energized. Terminal X is connected to the negative side of inverter circuit 22 through normally closed contacts PRR–2 and terminal Y is connected to the positive side of inverter circuit 22 through normally closed contacts PRR–3. The normally open contacts SOR–2–1 of the slow operating relay SOR–2 prevent the pulse control relay coil PCR–C from becoming energized. Also, neither coil LPR–C of the line pulsing relay circuit LPR, nor the advancing coil 32 of the impulse counter IC is energized since both sides of each coil are connected to the negative side of inverter circuit 22. Also, relay coil TR1–C of the off-normal circuit ONC is not energized since relay contacts LPR–3 and LPR–4 are open.

When switch S–1 is actuated so that its contacts 24 become closed and its contacts 26 become open, the slow operating relay coil SOR–1C will become energized by current flow therethrough from the positive side of battery BAT through the now closed contacts 24 of switch S–1, through coil SOR–1C, the normally closed contacts LPR–1 of relay circuit LPR and back to the negative side of the battery BAT. After a delay of about two seconds, relay coil SOR–1C will close its relay contacts SOR–1–1 thereby connecting relay coil PRR–C across battery BAT. The coil PRR–C will become energized closing its normally open contacts PRR–1 and PRR–4 and opening its normally closed contacts PRR–2 and PRR–3. The polarity of the voltage applied to terminals X, Y will be reversed with a positive polarity appearing at terminal X and a negative polarity appearing at terminal Y. Current will flow from the positive terminal X through the normally closed contacts PCR–1 of pulse control relay PCR and thence through the advancing coil 32 of the impulse counter IC, as well as through coil LPR–C of the line pulsing relay circuit LPR to the negative side of the inverter circuit 22. Coils 32 and LPR–C will become energized so that the counter CI will be advanced one step and the normally open contacts LPR–2, LPR–3, LPR–4 will become closed and the normally closed contacts LPR–1 will become opened. With contacts LPR–2 closed, slow operating relay coil SOR–2C will become energized by current flowing therethrough from the positive side of the battery BAT, through coil SOR–2C, and through the closed contacts LPR–2 to the negative side of battery BAT. Also, upon opening of contacts LPR–1 the energizing circuit for the slow operating relay SOR–1 will become broken whereby the coil SOR–1C will become de-energized to open its contacts SOR–1–1. When contacts LPR–3, LPR–4 are closed the positive terminal X will be connected to the terminal X1 and the negative terminal Y will be connected to the terminal Y2.

Toggle relay coil TR2–C of the first remote control circuit G will be energized by current flowing therethrough from the positive terminal X1 through its coil TR2–C and thence through the closed relay contacts TR1–2 of off-normal circuit ONC to the negative terminal Y2. When relay coil TR2–C of control circuit G becomes energized, its relay contacts TR2–1 and TR2–2 will become closed. Since the counter indicator CI has been previously advanced one count upon a first reversal of polarities applied to terminals X and Y which is indicative of energization of relay coil TR2–C of control circuit G, the operator may now, if desired, energize the remote relay J by actuating switch S–1 to again close contacts 26 and open contacts 24. If this is done, current will flow from the positive side of inverter circuit 22 through coil J, the anode to cathode circuit of diode 40 and through the now closed contacts TR2–2 to the negative side of the inverter circuit 22 through the now closed contacts LPR–3 and the now closed pulse reversal relay contacts PRR–4. The operator may then operate the switch S–1 to the condition in which contacts 24 are closed and contacts 26 are open to continue sequential testing of relays J, K, L. During the period in which relay coil TR2–C of control circuit G becomes energized, current will also flow from the positive terminal X1 through toggle relay coil TR1–C in the direction as indicated by the arrow, through the thermistor RT1, the anode to cathode circuit of diode 36, closed contacts TR1–2 and thence to the negative terminal Y2. The resistance of the thermistor RT1 is of such a value that it will prevent operation of the toggle relay TR1 until the resistance is reduced to a predetermined value by heating from current flow therethrough. This delay in time of operation of the toggle relay TR1 is sufficiently long to permit energization of toggle relay TR2 in the control circuit G before the toggle relay contacts TR1–1 and TR1–2 of toggle relay TR1 become opened.

After the slow operating relay SOR–2 has been energized for approximately four seconds, following closure of relay contacts LPR–2 of the line pulsing relay LPR, its normally open contacts SOR–2–1 will become closed thereby energizing relay coil PCR–C by current flow through the coil from the positive terminal X, through the coil, the now closed contacts SOR–2–1, the anode to cathode circuit of diode 28, and through the closed contacts PCR–4 to the negative terminal Y. Energization of relay coil PCR–C will cause its normally closed contacts PCR–1 and PCR–4 to become open and its normally open contacts PCR–2 and PCR–3 to become closed. When contacts PCR–4 become open the relay coil PCR–C will become de-energized again. However, since relay PCR is a toggle relay, its relay contacts PCR–2 and PCR–3 will remain closed until the relay is restored by applying a positive potential to the coil PCR–C, where indicated by the marking "+" in FIGURE 2. Current flow, however, through the now closed contacts PCR–3 will be blocked by the diode 30 so long as the voltage at terminal X is of positive polarity. With contacts PCR–1 opened the line pulsing relay coil LPR–C, as well as the impulse counter advancing coil 32, will become de-energized. De-energization of the line pulsing relay coil LPR–C will cause its relay contacts to be restored to the condition as indicated in FIGURE 2.

With relay contacts LPR–1 restored to their normally closed condition, the slow operating relay SOR–1 will be re-energized and after about a two second time delay its relay contacts SOR–1–1 will become closed to re-energize relay coil PRR–C thereby reversing the polarity of the voltage applied across terminals X and Y. The polarity of the voltage at terminal X will be negative and that at terminal Y will be positive. The toggle relay contacts PCR–2 are closed and, accordingly, the advancing coil 32, as well as the line pulse relay coil LPR–C, will be energized by current flow through the relay contacts PCR–2 to thereby close relay contacts LPR–3 and LPR–4 so that the voltage at terminal X1 will be of negative polarity and the voltage at terminal Y2 will be of positive polarity. Remote toggle relay TR2–C of control circuit H will be energized by current flowing through the closed relay toggle contacts TR2–1 of control circuit G and the toggle relay TR2 of control circuit G will be restored by current flowing from the positive terminal Y2 through the closed contacts TR2–1, diode 38, thermistor RT2 and thence through the coil TR2–C of control circuit G to the negative terminal X1.

On the next reversal of the polarities of voltage applied to terminals X and Y, toggle relay coil TR2–C of control circuit I will become energized and toggle relay coil TR2–C of control circuit H will become restored in a manner as described previously. Thereafter, upon a next succeeding reversal of polarities applied to terminals X and Y, toggle relay coil TR1–C of off-normal circuit ONC will be energized to return its contacts to the condition shown in FIGURE 2, through the closed toggle relay contacts TR2–1 of control circuit I and after a time delay determined by the characteristics of thermistor RT2 of control circuit I, its toggle relay TR2 will be restored.

With toggle relay TR1 of off-normal circuit ONC restored to the condition indicated in FIGURE 2, terminal Y2 will be of positive polarity whereby the reset coil 34 of the impulse counter will be energized to reset the counter indicator CI to its zero condition. After approximately a four second time delay the slow operating relay coil SOR–2C will close its contacts SOR–2–1 whereby the pulse control relay PCR–C will become energized to open its contacts PCR–2 and PCR–3 and close its contacts PCR–1 and PCR–4. With contacts PCR–2 open the line pulsing relay coil LPR–C will become de-energized restoring its contacts to the condition as indicated in FIGURE 2. At this point in the operation of the circuit illustrated in FIGURE 2, all of the components have been restored to their normal conditions.

In accordance with a preferred embodiment of the invention the values and types of various components illustrated in FIGURE 2 are found in Table I.

TABLE I

| Components | Component value or type |
|---|---|
| Toggle relays PCR, TR1, TR2 | Magnetic toggle relays, American Monarch MTR No. 15114. |
| Thermistor RT1, RT2 | 3000 ohms at 25° C., Globar No. 997–F. |
| Diodes 28, 30, 36, 38, 40 | Silicon diodes 500 milliamperes at 200 volts. |
| Switch S–1 | Two position switch, one normally open and one normally closed contacts. |
| Relay SOR–1 | Slow operating relay with two second time delay. |
| Relay SOR–2 | Slow operating relay with four second time delay. |
| Battery BAT | 24 volts, D.C. |
| Power supply PS | 115 volts alternating current line voltage. |

I claim:

1. A circuit for sequentially controlling the operation of a plurality of remotely located devices and comprising:
   a plurality of remote station bistable devices each having first and second stable states in response to alternate application thereto of opposite polarity pulses;
   a like plurality of switching means each associated with one of the bistable devices and each having first and second conditions in response to the first and second stable states, respectively, of its associated bistable device;
   each bistable device being connected in series with a switching means associated with a different polarity bistable device and a source of alternating polarity pulses;
   every other bistable device being normally in said first stable state and the intermediate bistable devices being normally in said second stable state;
   means for alternately applying alternate polarity pulses to said bistable devices, whereby the stable states of said bistable devices will be sequentially changed from a normal first state to a second state; and
   time delay means connecting each bistable device in series with its associated switching means for delaying restoration to a normal stable state of the bistable device until a succeeding bistable device has been actuated to its second stable state through the switching means associated with the first bistable device.

2. A circuit as set forth in claim 1 including:
   a common central station bistable circuit means associated with said plurality of remote station bistable devices and having first and second stable states in response to alternate application thereto of opposite polarity pulses.

3. A circuit for sequentially controlling the operation of a plurality of remotely located devices and comprising:
   a plurality of remote station control circuits each including a magnetic toggle relay having a relay coil and normally open relay contacts connected together in series across a pair of terminals, said relay contacts being opened only upon application of a direct voltage of one polarity across said relay coil and being closed only upon application of a direct voltage of the opposite polarity across said coil;
   time delay means for delaying energization of each said relay coil when its relay contacts are closed and voltage of said one polarity is applied across said pair of terminals;
   normally closed switching means for completing a circuit for the relay coil of the first remote station control circuit across said terminals;
   means for opening said normally closed switching means after energization of the said first remote station control relay coil;

said normally open relay contacts of the other said remote station control circuits each connected in series with a different one of said remote station relay coils for completing circuits across said terminals;

the odd numbered remote station toggle relays being normally magnetized with a polarity opposite that of the even numbered remote station toggle relays; and means for alternately applying direct voltage of said one polarity and said opposite polarity across said terminals, whereby said relay coils will be sequentially energized to sequentially close said relay contacts.

4. A circuit for sequentially controlling the operation of a plurality of remotely located devices and comprising:

a plurality of remote station control circuits each including a magnetic toggle relay having a relay coil and normally open relay contacts connected together in series across a pair of terminals, said relay contacts being opened only upon application of a direct voltage of one polarity across said relay coil and being closed only upon application of a direct voltage of the opposite polarity across said coil;

time delay means for delaying energization of each said relay coil when its relay contacts are closed and voltage of said one polarity is applied across said pair of terminals;

normally closed switching means for completing a circuit for the relay coil of the first remote station control circuit across said terminals;

means for opening said normally closed switching means after energization of the said first remote station control relay coil;

said normally open relay contacts of the other said remote station control circuits each connected in series with a different one of said remote station relay coils for completing circuits across said terminals;

the odd numbered remote station toggle relays being normally magnetized with a polarity opposite that of the even numbered remote station toggle relays;

means for alternately applying direct voltage of said one polarity and said opposite polarity across said terminals, whereby said relay coils will be sequentially energized to sequentially close said relay contacts; and said time delay means for each said toggle relay includes a thermistor connected in series with the relay coil and the relay contacts of said relay.

5. A circuit as set forth in claim 3 wherein each toggle relay includes second normally open relay contacts connected to a said remotely located device.

6. A circuit as set forth in claim 5 wherein each said device includes a remote relay coil, and means for connecting said remote relay coil across a voltage source when said second relay contacts are closed to energize said remote relay coil.

7. A circuit as set forth in claim 3 wherein said normally closed switching means take the form of relay contacts of a central station magnetic toggle relay and said opening means take the form of a relay coil of said central station magnetic toggle relay.

8. A circuit as set forth in claim 7 wherein said central station toggle relay is normally magnetically polarized the same as the first remote station toggle relay.

9. A circuit for sequentially controlling the operation of a plurality of remotely located devices and comprising:

a plurality of remote station control circuits each including a magnetic toggle relay having a relay coil and normally open relay contacts connected together in series across a pair of terminals, said relay contacts being opened only upon application of a direct voltage of one polarity across said relay coil and being closed only upon application of a direct voltage of the opposite polarity across said coil;

time delay means for delaying energization of each said relay coil when its relay contacts are closed and voltage of said one polarity is applied across said pair of terminals;

normally closed switching means for completing a circuit for the relay coil of the first remote station control circuit across said terminals;

means for opening said normally closed switching means after energization of the said first remote station control relay coil;

said normally open relay contacts of the other said remote station control circuits each connected in series with a different one of said remote station relay coils for completing circuits across said terminals;

the odd numbered remote station toggle relays being normally magnetized with a polarity opposite that of the even numbered remote station toggle relays;

means for alternately applying direct voltage of said one polarity and said opposite polarity across said terminals, whereby said relay coils will be sequentially energized to sequentially close said relay contacts;

said normally closed switching means take the form of relay contacts of a central station magnet toggle relay and said opening means take the form of a relay coil of said central station magnetic toggle relay;

central station toggle relay is normally magnetically polarized the same as the first remote station toggle relay; and the normally open relay contacts for the last of said remote station toggle relays are connected in series with the central station toggle relay coil across said terminals for closing the central station relay contacts.

10. A circuit as set forth in claim 9 including indicating means responsive to each reversal of polarity of voltage applied across said terminals for indicating which remote station toggle relay contacts are closed.

11. A circuit as set forth in claim 10 including means responsive to closure of said central station toggle relay contacts to reset said indicating means.

References Cited

UNITED STATES PATENTS 2,542,079   2/1951   Grundin et al. ____ 340—168 XR

DONALD J. YUSKO, *Primary Examiner.*

U.S. Cl. X.R.

317—157, 140